United States Patent
Storm

(10) Patent No.: US 7,196,479 B2
(45) Date of Patent: Mar. 27, 2007

(54) ELECTRONIC BALLAST HAVING A PROTECTIVE CIRCUIT FOR A SWITCHING TRANSISTOR OF A CONVERTER

(75) Inventor: Arwed Storm, Dachau (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 10/963,533

(22) Filed: Oct. 14, 2004

(65) Prior Publication Data

US 2005/0088109 A1  Apr. 28, 2005

(30) Foreign Application Priority Data

Oct. 22, 2003  (DE)  .................... 103 49 036

(51) Int. Cl.
*H05B 37/02* (2006.01)
(52) U.S. Cl. ............... 315/209 R; 315/224; 315/291; 363/21.08; 363/21.1
(58) Field of Classification Search ............ 315/209 R
See application file for complete search history.

(56) References Cited

U.S. PATENT DOCUMENTS

| | | | | | |
|---|---|---|---|---|---|
| 3,702,434 | A | * | 11/1972 | Ryan | 323/282 |
| 3,946,280 | A | * | 3/1976 | Quist | 361/88 |
| 4,020,408 | A | * | 4/1977 | Grant | 363/21.08 |
| 4,884,180 | A | * | 11/1989 | Hoffmann | 363/21.1 |
| 5,430,405 | A | * | 7/1995 | Cohen | 327/581 |
| 5,677,602 | A | * | 10/1997 | Paul et al. | 315/224 |
| 6,181,079 | B1 | * | 1/2001 | Chang et al. | 315/247 |
| 6,690,122 | B2 | | 2/2004 | Weirich | 315/307 |
| 2004/0041621 | A1 | * | 3/2004 | Limmer | 327/536 |
| 2004/0051479 | A1 | * | 3/2004 | Weirich | 315/291 |

FOREIGN PATENT DOCUMENTS

DE  101 10 239  7/2002

* cited by examiner

*Primary Examiner*—Don Wong
*Assistant Examiner*—Binh Van Ho
(74) *Attorney, Agent, or Firm*—Carlo S. Bessone

(57) ABSTRACT

The invention relates to an electronic ballast for lamps having a converter, in which a switching transistor is protected against transient disturbances by a detection circuit C1, C2, R1, R2, D1–3, T1. In this case, the time derivative of the voltage is taken into consideration.

15 Claims, 1 Drawing Sheet

ELECTRONIC BALLAST HAVING A PROTECTIVE CIRCUIT FOR A SWITCHING TRANSISTOR OF A CONVERTER

FIELD OF THE INVENTION

The present invention relates to electronic ballasts for operating lamps or other light-emitting products.

BACKGROUND OF THE INVENTION

Different types of converters which often contain at least one switching transistor are used in electronic ballasts.

SUMMARY OF THE INVENTION

The invention is based on the technical problem of specifying an improved electronic ballast having a converter which has a switching transistor.

The invention is aimed at an electronic ballast having a converter, which is fed from a power supply and has a switching transistor, and a circuit for detecting the time derivative of the voltage of the power supply, which circuit is designed to protect the switching transistor of the converter from being overloaded in response to the detected time derivative by means of a switching operation.

The invention also relates to a method, and the description which follows makes reference to both the character of the device and the character of the method.

The inventor has established that there is the risk of damage with the ballasts presented in the invention when specific voltage peaks are introduced from a system power supply. In this manner, the switching transistors of the converters can be destroyed in the event of high-energy, transient disturbances (for example according to EN 61547), in particular also as a result of overcurrents, if they are actuated in this phase. The invention is therefore based on a circuit for protecting the switching transistor. In this case, the protective circuit monitors the supply voltage and, if necessary, disconnects the switching transistor to be protected.

Instead of disconnecting the switching transistor to be protected, it is also possible, in principle, for the switching transistor to be removed from the area which is at risk using circuit logic, or to add in to the circuit a protective element, for example a protective resistor. Such measures usually involve a further switching element, with the result that the procedure selected in the claim, in which the switching transistor is to be protected by means of a switching operation, may relate to both a switching operation in the switching transistor and to another switching element. A preferred and simpler option is, of course, to disconnect the switching transistor itself.

In the process, the inventor has also established that the in per se more obvious detection of the supply voltage itself, i.e. of the amplitude, firstly often requires threshold values to be set relatively accurately, in order, on the one hand, to accept amplitudes which are still permissible and possible and, on the other hand, to react sufficiently quickly when there are amplitudes which are no longer permissible. Critical, transient disturbances can be detected in a more favorable manner using the time derivative of the supply voltage. In the cases just mentioned, the setting of the response behavior of the detection circuit is in this case less critical, since these transient disturbances often have steep rising edges. Furthermore, the detection of the time derivative also allows for disconnection at an earlier point in time, as early as in the rising edge and not only when critical voltage values are reached.

The invention is of particular use for so-called power factor correction circuits (PFC circuits), which, in the case of modern electronic ballasts, are often connected upstream of the converters supplying power to the lamp and which are known per se to those skilled in the art and therefore do not need to be explained in detail here. Such power factor correction circuits often contain converters which also have, in addition to a switching transistor, a storage inductor. In these cases, the switching transistor is at risk from saturation currents from the storage inductor as a result of transient disturbances.

In this case, a particularly preferred application is in so-called step-down converters, which produce smaller voltages than the supply voltage amplitude. A particularly preferred example, which can function both as a step-up converter and as a step-down converter and is thus considered to be a step-down converter in the context of this invention, is a SEPIC converter. The principle of the SEPIC converter will not be explained in detail here, either. Instead, reference is made to the literature and, by way of example, to the German patent application 101 10 239.9.

The detection circuit presented in the invention preferably contains an output transistor for producing an output signal, which results in the switching transistor being disconnected. In particular, the switching path of the output transistor can drive the control electrode of the switching transistor, as is shown in the exemplary embodiment. In this case, the output transistor is, for example, connected to an AND gate in a drive circuit for the control electrode of the switching transistor and thus results in the switching transistor drive being disabled. However, in principle it is also conceivable to position the switching path of the output transistor between a drive circuit and the control electrode of the switching transistor and to open this connection.

A DC voltage isolating capacitor for detecting the time derivative, by means of which the detection circuit is DC-isolated from the supply voltage, is also preferably used in the detection circuit. The voltages and potentials in the detection circuit may thus be independent of the supply voltage.

A further preferred feature of the detection circuit is a capacitive divider circuit, at whose center tap the signal representing the time derivative is tapped off. The mentioned DC voltage isolating capacitor is preferably part of this capacitive divider circuit.

In addition, the detection circuit preferably has a resistive voltage divider circuit, making it possible to set the operating point for triggering the disconnection process. In particular, the control electrode of the mentioned output transistor may be connected to the center tap of the resistive voltage divider circuit.

A timing element may also be provided in order to be able to drive a disconnection process by individually detecting a voltage time derivative. In principle, it would also be possible to monitor the supply voltage or its time derivative to such an extent that the end of the transient disturbance is detected. However, it is more favorable to use a timing element to prescribe a time period sufficient for the transient disturbances to be expected. In particular, the timing element may be combined, in the form of an RC element, with the capacitive divider circuit and/or the resistive voltage divider circuit and comprise a capacitor and a resistor from these respective circuits. A rectifier diode may be provided to prevent the RC timing element from being discharged in an undesired manner. Here too, reference is made to the exemplary embodiment for illustrative purposes.

Furthermore, the detection circuit may also have a Zener diode, which can be used to prescribe a response threshold with respect to the detected time derivative. This has the advantage that two or more successive relatively small disturbances having time derivatives which are in each case not sufficient in themselves are not cumulatively measured quasi-integrally in the sequence of the timing element. Rather, the Zener diode in this case would block time derivative values which are too small, and a response within the time period defined by the timing element would only be allowed when the voltage threshold of the Zener diode is exceeded.

Further details are given in the description below of an exemplary embodiment, whose features may also be essential to the invention in other combinations. dr

DETAILED DESCRIPTION OF THE INVENTION

Figure 1:
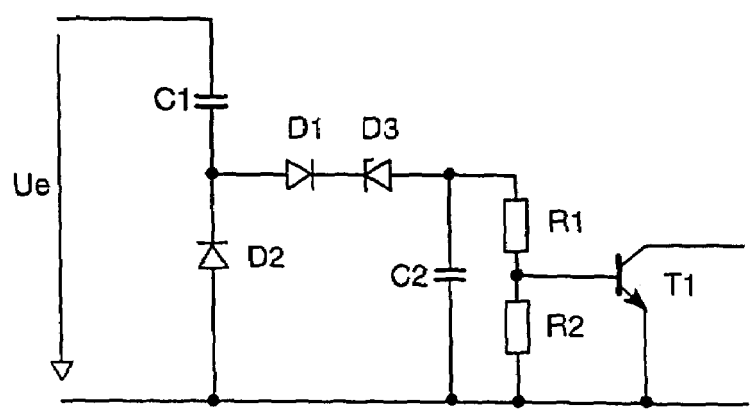
FIG. 1 shows an outline circuit diagram of the detection circuit presented in the invention.

In FIG. 1, the input voltage Ue of a SEPIC converter (not illustrated in FIG. 1) is applied to a capacitive divider circuit formed from two capacitors C1 and C2. The upper terminal of a resistive voltage divider circuit comprising two resistors R1 and R2 is connected to the center tap of the divider circuit comprising the capacitors C1 and C2, the lower terminals of the two divider circuits being connected to a common reference potential (internal ground). The center tap of the resistive voltage divider circuit comprising the resistors R1 and R2 drives the base of a bipolar output transistor T1, whose collector terminal, in the emitter circuit, indirectly drives the base or the gate of a switching transistor (not shown) of the SEPIC converter, as is shown below in FIG. 2.

Incoming transient voltage peaks are introduced as an AC voltage by the capacitor C1, a rectifier diode D2, which is connected between the center tap of the capacitive divider circuit comprising the capacitors C1 and C2 and the internal reference potential, making it possible for the capacitor C1 to subsequently be discharged.

In this context, reference is made to the fact that the detection circuit shown detects the input voltage Ue following rectification upstream of the SEPIC converter, with the result that account need only be taken of the polarity of the transient disturbances.

The transient disturbances which are introduced as an AC voltage are passed on via a Zener diode D3 to the resistive voltage divider circuit, and thus only get beyond the Zener diode D3 when they exceed the voltage threshold specified by it.

The resistive voltage divider circuit comprising the resistors R1 and R2 then sets a suitable operating point by dividing the voltage signals to be expected into suitable values for driving the base of the output transistor T1.

The capacitor C2 which has already been mentioned in the context of the capacitive divider circuit also forms, together with the resistors, essentially with the resistor R1, a timing element. That is to say, if the capacitor C2 is charged by voltage pulses passing through the Zener diode D3, it is discharged via R1 and the output transistor T1 at a specific time constant. This time constant essentially defines a minimum time for which the output transistor T1 is driven.

The rectifier diode D1 between the capacitors C1 and C2 in this case prevents the capacitor C2 from being discharged in an undesired manner.

Figure 2:
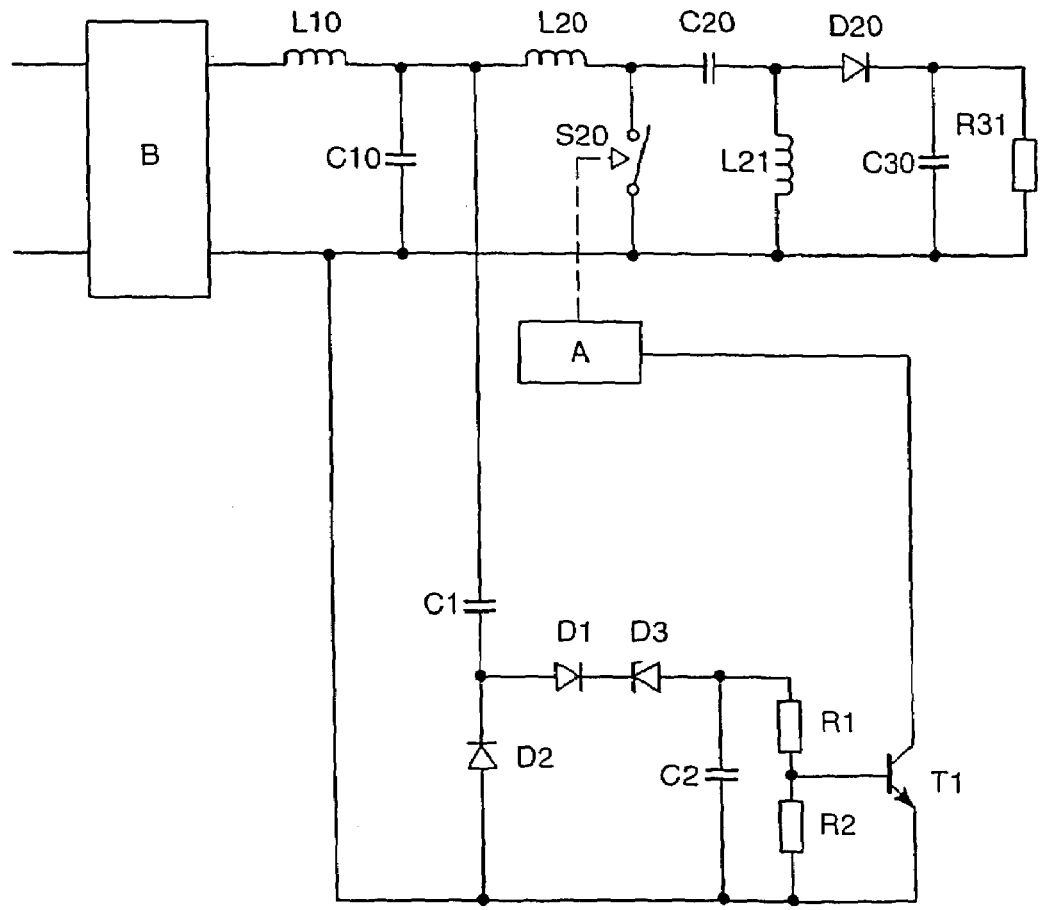
FIG. 2 shows an outline circuit diagram of a ballast according to the invention.

FIG. 2 shows the detection circuit from FIG. 1 in an electronic ballast according to the invention. In this ballast, an AC supply voltage, generally a conventional household system voltage, is rectified via a bridge rectifier B. In FIG. 2, there is thus a rectified, positive potential on the upper horizontal conductive branch, and a rectified, negative potential, which is generally the reference potential, on the lower conductive branch which is parallel thereto. The rectified AC voltage forms the input of a SEPIC converter, which has the inductors L20 and L21, the capacitor C20, the rectifier diode D20 and the switching transistor S20 and is driven by a drive circuit A. A further inductor L10 and a further capacitor C10, which are used for filtering purposes, are connected between the bridge rectifier and the SEPIC converter. These components result in current and voltage values being exceeded and increase the advantages of the invention.

Connected to the output (shown on the right) of the SEPIC converter, i.e. in parallel with a storage capacitor C30, is a load R31, which is supplied with a DC voltage made available by the capacitor C30. The load R31 is a conventional half-bridge oscillator having two switching transistors for producing a high-frequency AC voltage, with which a low-pressure gas discharge lamp can be operated. Since such circuits constitute prior art and are generally known, the load is merely represented by a resistor in this case.

The capacitor C30 acts as a storage capacitor and must be charged by the SEPIC converter from the rectified AC voltage to a DC voltage which is as constant as possible. In this case, the power consumption from the power supply system should be matched to the sinusoidal waveform of the system voltage with as few disturbances as possible.

Using an alternating switching operation for the switching transistor S20, when the switching transistor is closed, the coil L20 is charged from the rectified system voltage to a specific current and, when the switching transistor S20 is open, said coil L20 is discharged to the capacitor C20. In a similar manner, the coil L21 is charged when the switching transistor S20 is closed and is discharged to the storage capacitor C20 when the switching transistor S20 is open. In this case, the polarity of the diode D20 is to be taken into consideration. So-called intermittent operation results when the times for which the switching transistor S20 is open are sufficiently long for the current in the rectifier diode D20 to be reduced to zero. In this case, on average, the capacitor C20 is essentially charged to the value of the supply voltage rectified at that time. This in turn results in the storage capacitor C30 being charged when the switching transistor is open only with the induced voltage produced by the coil L21. A corresponding clock ratio, i.e. the ratio between the times for which the switching transistor is closed and open, thus makes it possible, taking into account the load R31, to set essentially any desired DC voltage across the capacitor C30 which may, in particular, be smaller than the amplitude of the system voltage. The SEPIC converter then functions as a step-down converter. The capacitor C20 to a certain extent decouples the two inductors L20 and L21 from one another, such that, in contrast to simple step-up converters, the voltages produced by the coil L20 do not add up to the instantaneous system voltage.

The intermittent switching operation of the switching transistor S20 is ensured by the drive circuit A, which is provided in the form a microcontroller and which can be inactivated in turn via the output transistor T1 already mentioned. The output transistor T1 fundamentally quantizes between two states in response to the voltage tap at the resistive voltage divider circuit comprising the resistors R1 and R2. For this purpose, the output signal of the output transistor T1 is fed to an AND gate in the drive circuit A, which may result in the drive for the switching transistor S20 being disabled as described.

The voltage referenced Ue in FIG. 1 is tapped off in the manner shown in FIG. 2 at the filtered output of the bridge rectifier, but could also be tapped off directly at the output, i.e. upstream of the filter. These two possibilities must be weighed up in the individual case depending on whether filtering is helpful for the detection or not.

In the manner described, the switching transistor S20 of the SEPIC converter can be reliably disconnected within a few microseconds. This prevents, in particular, transient overvoltages resulting in currents which are too high and which could represent a risk for the switching transistor S20 when the switching transistor S20 is connected in this phase, owing to saturation of the storage inductor L20 of the SEPIC converter. In particular, in the case of specific types of converter, in particular also in the case of the SEPIC converter, voltage levels may be exceeded, which would exacerbate the problem described, following transient disturbances, as a result of LC resonance in the converter, but also in the system filter.

However, the protective function of the invention may also relate to voltages in this case. In particular, in the case of the SEPIC converter, during converter clocking, the input and the output voltage are added, but without clocking only the input voltage is still applied to the switching transistor. The switching transistor can thus be at risk in terms of voltage here too, and is protected by being disconnected.

The invention thus overall offers a simple, favorable and effective way of protecting the converter and thus the entire ballast from transient disturbances. In addition, it may easily be combined with other protective measures, for example those which respond to the voltage values per se (i.e. the amplitude).

The invention claimed is:

1. An electronic ballast having a converter (L20, L21, C10, C30, S20, D20), which is fed from a power supply and has a switching transistor (S20), and
a circuit (C1, C2, R1, R2, D1–3, T1) for detecting the time derivative of the voltage of the power supply, which circuit is designed to protect the switching transistor (S20) of the converter (L20, L21, C20, C30, S20, D20) from being overloaded in response to the detected time derivative by means of a switching operation.

2. The ballast as claimed in claim 1, in which the converter (L20, L21, C20, C30, S20, D20) is a power factor correction circuit and contains a storage inductor (L20), and the detection circuit (C1, C2, R1, R2, D1–3, T1) is designed to prevent the switching transistor (S20) from being overloaded by a saturation current from the storage inductor (L20) by being disconnected.

3. The ballast as claimed in claim 1, in which the converter (L20, L21, C20, C30, S20, D20) is a step-down converter.

4. The ballast as claimed in claim 3, in which the converter (L20, L21, C20, C30, S20, D20) is a SEPIC converter.

5. The ballast as claimed in claim 1, in which the detection circuit (C1, C2, R1, R2, D1–3, T1) has an output transistor (T1), which can produce, in response to the detection of the time derivative of the voltage, an output signal which results in the switching transistor (S20) being disconnected.

6. The ballast as claimed in claim 1, in which the detection circuit (C1, C2, R1, R2, D1–3, T1) has a DC voltage isolating capacitor (C1), by means of which the time derivative is detected.

7. The ballast as claimed in claim 6, in which the detection circuit (C1, C2, R1, R2, D1–3, T1) has a capacitive divider circuit (C1, C2), which contains the DC voltage isolating capacitor (C1).

8. The ballast as claimed in claim 7, in which the detection circuit (C1, C2, R1, R2, D1–3, T1) has a resistive voltage divider circuit (R1, R2) for the purpose of setting the operating point.

9. The ballast as claimed in claim 8, in which the detection circuit (C1, C2, R1, R2, D1–3, T1) has a timing element (R1, C1) for determining a time period for which the switching transistor (S20) is disconnected.

10. The ballast as claimed in claim 9, in which the timing element (R1, C1) contains a capacitor (C1) from the capacitive divider circuit (C1, C2) and a resistor (R1) from the voltage divider circuit (R1, R2).

11. The ballast as claimed in claim 1, in which the detection circuit (C1, C2, R1, R2, D1–3, T1) has a Zener diode (D3) for determining a response threshold when detecting the time derivative of the voltage.

12. A method for operating a lamp having an electronic ballast as claimed in claim 1, in which the detection circuit (C1, C2, R1, R2, D1–3, T1) detects the time derivative of the voltage of the power supply and disconnects the switching transistor (S20) in response to the detected time derivative.

13. The ballast as claimed in claim 1, in which the detection circuit (C1, C2, R1, R2, D1–3, T1) has a resistive voltage divider circuit (R1, R2) for the purpose of setting the operating point.

14. The ballast as claimed in claim 1, in which the detection circuit (C1, C2, R1, R2, D1–3, T1) has a timing element (R1, C1) for determining a time period for which the switching transistor (S20) is disconnected.

15. The ballast as claimed in claim 2, in which the converter (L20, L21, C20,C30, S20, D20) is a step-down converter.

* * * * *